(12) United States Patent
Sagara (10) Patent No.: US 7,071,991 B2
(45) Date of Patent: Jul. 4, 2006

(54) IMAGE DECODING APPARATUS, SEMICONDUCTOR DEVICE, AND IMAGE DECODING METHOD

(75) Inventor: Taisuke Sagara, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 461 days.

(21) Appl. No.: 09/761,775

(22) Filed: Jan. 18, 2001

(65) Prior Publication Data

US 2001/0009444 A1 Jul. 26, 2001

(30) Foreign Application Priority Data

Jan. 21, 2000 (JP) ........................ 2000-013424

(51) Int. Cl.
*H04N 7/01* (2006.01)
*H04N 11/20* (2006.01)

(52) U.S. Cl. .................. 348/441; 348/445; 348/554; 348/476; 348/478

(58) Field of Classification Search ............ 348/441, 348/445, 446, 448, 455, 521, 522, 525, 524, 348/473, 476, 477, 478, 423.1; 375/240.29, 375/240.28; H04N 7/01, 11/20
See application file for complete search history.

(56) References Cited

U.S. PATENT DOCUMENTS

| 5,325,131 | A | * | 6/1994 | Penney ...................... 348/706 |
| 5,459,585 | A | | 10/1995 | Owashi et al. |
| 5,475,435 | A | | 12/1995 | Yonemitsu et al. |
| 5,801,777 | A | * | 9/1998 | Lyu ............................ 348/409 |
| 6,069,664 | A | * | 5/2000 | Zhu et al. ................... 348/448 |
| 6,175,387 | B1 | * | 1/2001 | Han ............................ 348/565 |
| 6,175,682 | B1 | * | 1/2001 | Tanaka et al. ................ 386/92 |
| 6,177,946 | B1 | * | 1/2001 | Sinclair et al. .............. 345/501 |
| 6,477,204 | B1 | | 11/2002 | Fukushima et al. |
| 6,538,675 | B1 | * | 3/2003 | Aratani et al. ............... 345/856 |

FOREIGN PATENT DOCUMENTS

| JP | 3-131185 | 6/1991 |
| JP | 5-176305 | 7/1993 |
| JP | 5-252520 | 9/1993 |
| JP | 6-90432 | 3/1994 |
| JP | 6-153183 | 5/1994 |
| JP | 7-162810 | 6/1995 |
| JP | 8-88838 | 4/1996 |
| JP | 11-187396 | 7/1999 |
| JP | 2000-316140 | 11/2000 |

* cited by examiner

*Primary Examiner*—Brian Yenke
*Assistant Examiner*—Trang U. Tran
(74) *Attorney, Agent, or Firm*—Foley & Lardner LLP (57) ABSTRACT

The present invention provides an image decoding apparatus, a semiconductor device, and a image decoding method, capable of outputting images simultaneously using different formats. In the image decoding apparatus, an MPEG decoding portion 1 decodes an inputting coded data and stores the decoded data in an external memory portion 12. A decoded data reading portion 2 reads decoded data in the image output sequence from the external memory portion 12 and outputs the decoded data as the decoded data signal B1. A first image format converting portion 3-1 converts the decoded data signal B1 into a prescribed image format and outputs a first image output. Furthermore, a second image format converting portion 3-2 converts the decoded data signal B1 into a prescribed image format and outputs a second image output after synchronizing a second vertical image synchronizing signal A2, which is synchronized with a first vertical image synchronizing signal A1.

27 Claims, 5 Drawing Sheets

IMAGE DECODING APPARATUS, SEMICONDUCTOR DEVICE, AND IMAGE DECODING METHOD

BACKGROUND OF THE INVENTION

1. Field of the Invention

The present invention relates to an image decoding apparatus, capable of simultaneously outputting images with different image formats, a semiconductor device, and an image decoding method.

2. Background Art

Recently, two moving image coding standards called MPEG (Moving Picture Expert Group) have been practically used as the moving image coding systems; one is MPEG 1 (International Electric Communication union ITU-T Recommendation H. 261), which is a standard for moving image and storage media and the other is MPEG 2 (ITU-T Recommendation H. 262), which corresponds to a standard for higher image quality and high speed coding. Among these standards, the MPEG 2 has been widely noticed as a media integrated moving image coding standard in joint operations of the fields of communication, accumulation, broadcasting, and computer. MPEG 2 provides the image quality of present television system such as the present NTSC system with an information amount of 4 to 9 megabits, and provides the image quality of HDTV (high resolution television) with an amount of information of 15 to 30 megabits. An explanation is provided below of MPEG 1 and MPEG 2 referred to as a whole as MPEG.

Figure 6:
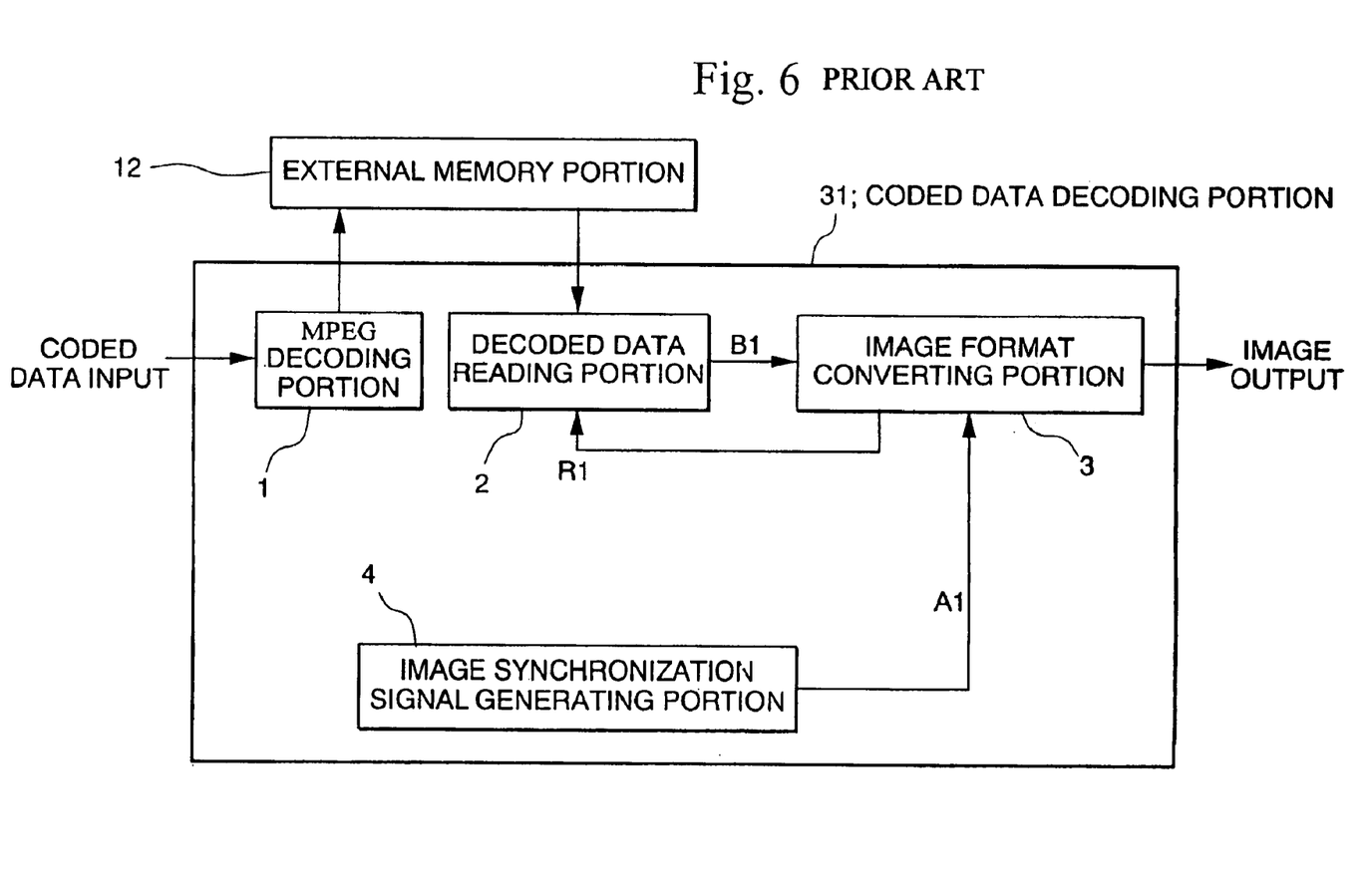
FIG. 6 is a block diagram showing the structure of the conventional image decoding apparatus.

FIG. 6 is a block diagram showing the structure of the conventional image decoding apparatus, wherein the input coded data correspond to coded bit stream in the form of the above MPEG. As shown in FIG. 6, the conventional image decoding apparatus comprises a coded data decoding portion 31 and an external memory portion 12.

In the above-mentioned coded data decoding portion 31, reference numeral 1 denotes an MPEG decoding portion for storing the decoded data temporarily, corresponding to the image data obtained by decoding the coded data in an external memory portion 12, and reference numeral 2 denotes a decoded data reading portion for outputting as the decoded data signal B1 after reading the decoded data from the external memory portion B1 based on the image output sequence in response to the decoded data request signal R1. Reference numeral 3 denotes an image format converting portion for generating and outputting the image after converting input decoded data signals B1 to a prescribed image format, and reference numeral 4 denotes an image synchronizing signal generating portion for generating and outputting a horizontal image synchronizing signal (not shown in FIG. 6) and vertical image synchronizing signal A1, which corresponds to the image format to be converted by the image format converting portion 3.

The above-described conventional image decoding apparatus generates an image data by decoding coded data input from the MPEG decoding portion 1 and outputs the image after converting the image data into the image data of a prescribed image format by the image format converting portion 3. The image format converting portion 3 synchronizes the horizontal image synchronizing signals generated by the image synchronizing signal generating portion 4 and the image output to the vertical image synchronizing signal A.

However, the above-described conventional image decoding apparatus is not capable of decoding input coded data and simultaneously outputting images prepared by various image formats.

SUMMARY OF THE INVENTION

The present invention is carried out to solve the above-described problems. The objects of the present invention are therefore to provide an image decoding apparatus, capable of simultaneously outputting images prepared in various formats, a semiconductor device, and an image decoding method.

The first aspect of the present invention provides an image decoding apparatus, provided with a decoding device, which decodes the inputting coded data of an image for generating an image data, comprising: first to N-th (N is an integer more than 2) image format conversion devices for generating and outputting first to N-th images after converting said image data into predetermined image formats.

The second aspect of the present invention provides an image decoding apparatus comprising: first to N-th decoding devices which convert input first to N-th image coded data for generating and outputting a first to an N-th image data by decoding said first to N-th image coded data; and first to N-th image format conversion devices for generating and outputting a first and an N-th image data by converting any of said image data among said first to N-th image data into respective predetermined image formats.

According to the third aspect, in an image decoding apparatus according to the second aspect, the image decoding apparatus comprises a distribution control apparatus for distributing any of image data among first to n-th image data respectively to the first to the N-th image format conversion devices, in response to a request of said first to N-th image format conversion device.

According to the fourth aspect, in an image decoding apparatus according to the second aspect, at least one of said first to N-th image coded data is input through a PCI (Peripheral Component Interconnect) bus.

According to the fifth aspect, in an image decoding apparatus according to the first aspect, the image decoding apparatus comprises: an image synchronizing signal generation device for generating and outputting a first vertical image synchronizing signal used for outputting said image by any one of the image format conversion devices among said first to N-th image format conversion devices; and first to M-th (M: an integer which equals N−1) image synchronizing signal generating and synchronization adjusting devices for generating and outputting second to N-th vertical image synchronizing signals respectively in synchronism with said first vertical image synchronizing signal by said image format conversion devices other than said any one of image format conversion device.

According to the sixth aspect, in an image decoding apparatus according to the fifth aspect, said first to M-th image synchronizing signal generating and synchronization adjusting devices comprise: a counter for generating any one of said second to N-th vertical image synchronizing signals generated and output respectively by said first to M-th image synchronizing signal generating and synchronization adjusting devices; and a counter control device for controlling the operation of said counter based on said first vertical image synchronizing signal.

According to the seventh aspect, in an image decoding device according to the first aspect, wherein at least one of said image format conversion devices among said first to N-th image format conversion devices generates an image converted into a format composed of 1920 pixels in the horizontal direction and 1080 lines in the vertical direction, and at least one of said image format conversion devices generates an image converted into a format composed of 720 pixels in the horizontal direction and 480 lines in the vertical direction.

According to the eighth aspect, in an image decoding apparatus according to the second aspect, at least one of said decoding device and said first to N-th image format conversion devices are formed on the same semiconductor integrated circuit substrate.

According to the ninth aspect, the present invention provides a semiconductor device comprising: a decoding device for generating an image data by decoding an inputting image coded data, and for storing the thus generated image data in an externally-installed memory device; a decoded data reading device for reading said image data stored in said memory device in response to an inputting decoded data request signal and for outputting as the decoded data; an image synchronizing signal generation device for generating and outputting a first horizontal image synchronizing signal and a first vertical image synchronization; an image synchronizing signal generating and synchronization adjusting device for generating and outputting a second horizontal image synchronizing signal and a second vertical image synchronizing signal, which is synchronized with said first vertical image synchronizing signal;

a first image format conversion device for generating a first image by converting said inputting decoded data signal into a predetermined image format, and for outputting said first image after synchronizing with said first horizontal image synchronizing signal and said first vertical image synchronizing signal; and a second image format conversion device for generating a second image by converting said inputting decoded data signal into a predetermined image format, and for outputting said second image after synchronizing with said second horizontal image synchronizing signal and said second vertical image synchronizing signal.

The present invention provides a semiconductor device comprising: a first decoding device for generating a first image data by decoding an inputting first image coded data and for storing the generated first image data in an externally-installed memory device; a second decoding device for generating a second image data by decoding an inputting second image coded data, and for storing the generated second image data in an externally-installed memory device; a decoded data reading device for reading said first or second image data stored in said memory device in response to an inputting first decoded data request signal and for reading said first or second image data stored in said memory device in response to an inputting second decoded data request signal and for outputting a multiplexed decoded data prepared by multiplexing said first or second image data; a distribution control device for distributing said multiplexed decoded signal to a first decoded data signal corresponding to said first decoded data request signal and a second decoded data signal corresponding to said second decoded data request signal; an image synchronizing signal generation device for generating a first horizontal image synchronizing signal and a first vertical image synchronizing signal; an image synchronizing signal generating and synchronization adjusting device for generating and outputting a second horizontal image synchronizing signal and a second vertical image synchronizing signal; a first image format conversion device, which outputs a first decoded data request signal for generating a first image by converting said inputting decoded data signal into a predetermined image format and for outputting said first image after synchronizing with said first horizontal image synchronizing signal and said first vertical image synchronizing signal; and a second image format conversion device which outputs a second decoded data signal for generating a second image by converting said inputting decoded data signal into a predetermined image format, and for outputting said second image after synchronizing with said second horizontal image synchronizing signal and said second vertical image synchronizing signal.

According to the eleventh aspect, in a semiconductor device according to the tenth aspect, at least said decoding device, said image synchronizing signal generating device, said image synchronizing signal generating and synchronization adjusting device, said image format conversion device, and said second image format conversion device are formed on a semiconductor integrated circuit substrate.

According to the twelfth aspect, in an image decoding method for decoding an inputting image coded data and for generating an image data comprises the steps of: generating a first horizontal image synchronizing signal and a first vertical image synchronizing signal; generating a second horizontal image synchronizing signal and a second vertical image synchronizing signal which is synchronized with said first vertical image synchronizing signal; generating a first image by converting said image data into a predetermined image format and outputting the generated first image after synchronizing said first image with said first horizontal image synchronizing signal and with said first vertical image synchronizing signal; and generating a second image by converting said image data into a predetermined image format and outputting the generated second image after synchronizing said second image with said second horizontal image synchronizing signal and with said second vertical image synchronizing signal.

The present invention provides an image decoding method comprising: generating a first image data by decoding an input first image coded data; generating a second image data by decoding an input second image coded data; controlling the distribution of said first and second image data to their request sources; generating a first horizontal image synchronizing signal and a first vertical image synchronizing signal; generating a second horizontal image synchronizing signal and a second vertical image synchronizing signal synchronized with said first vertical image synchronizing signal; generating a first image from said requested first image data by converting into a predetermined image format and outputting said first image after synchronizing said first image with said first horizontal image synchronizing signal and said first vertical image synchronizing signal; and generating a second image from said requested second image data by converting into a predetermined image format and outputting said second image after synchronizing said second image with said second horizontal image synchronizing signal and said second vertical image synchronizing signal.

DETAILED DESCRIPTION OF THE INVENTION

Hereinafter, embodiments of the present invention are described with reference to the attached figures.

Figure 1:
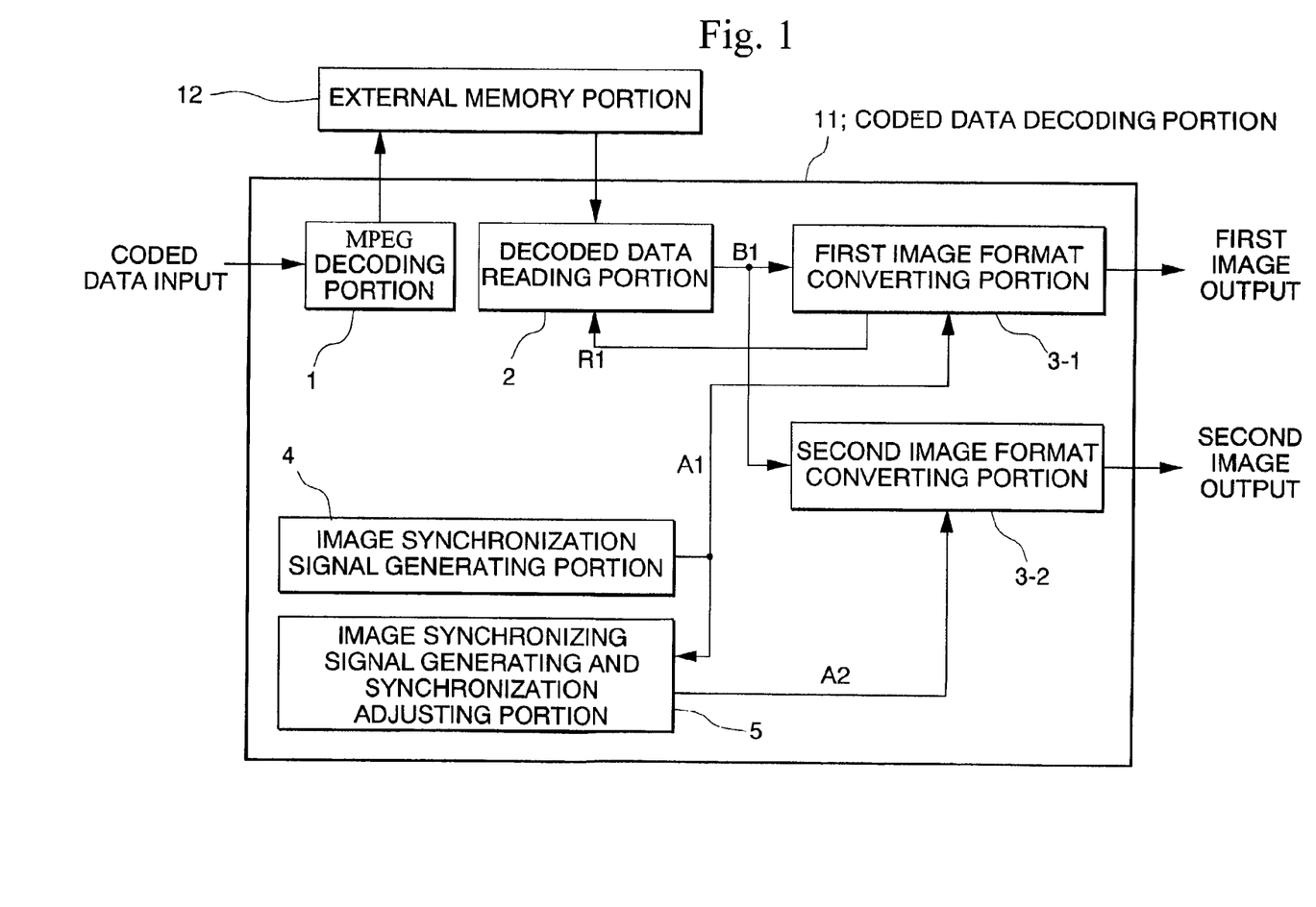
FIG. 1 is a block diagram showing the structure of the image decoding apparatus according to the first embodiment of the present invention.

FIG. 1 is a block diagram showing the structure of the image decoding apparatus according to the first embodiment of the present invention. The image decoding apparatus shown in FIG. 1 according to the first embodiment of the present invention is constituted by a coded data decoding portion 11 and an external writable memory device 12, such as a random access memory.

In the coded data decoding portion 11 shown in FIG. 1, reference numeral 1 denotes an MPEG decoding portion, which includes a variable length decoding portion, an inverse quantization portion, an inverse discrete cosine converting portion, and a moving compensation prediction portion, for generating image data by decoding the input coded data, and for temporarily storing the thus generated image data (hereinafter, called the decoded data) in an external memory portion 12, reference numeral 2 denotes a decoded data reading portion for reading the decoded data from the external memory portion 12 and for outputting the thus read decoded data as the decoded data signals B1. The reference numeral 3-1 denotes a first image format converting portion for converting the decoded data signals B1 input from the decoded data reading portion 2 and outputting a first image data in response to the decoded data signals B1, and reference numeral 3-2 denotes a second image format converting portion for converting the decoded data signals B1 input from the decoded data reading portion 2 and outputting a second image data. Furthermore, the reference numeral 4 denotes an image synchronizing signal generating portion for generating and outputting a first horizontal image synchronizing signal (not shown in FIG. 1 ) corresponding to the image format converted by the first image format converting portion 3-1 and a first vertical image synchronizing signal A1, and reference numeral 5 denotes an image synchronizing signal generating and synchronizing adjusting portion for generating and outputting a second horizontal image synchronizing signal (not shown in FIG. 1 ) corresponding to the image format converted by the second image format converting portion 3-2 and for generating a second vertical image synchronizing signal A2 in synchronization with, and at the same phase as the first vertical image synchronizing signal A1 input from the image synchronizing signal generating portion 4.

It is noted that the above-described coded data represents the image data in the form of a coded bit stream of the MPEG format, corresponding to data transmitted by digital broadcasting such as Broadcast Satellite or data read from a digital storage medium.

It is also noted that the above described prescribed image format designates, for example, a format called 1080 i format, composed of 1920 pixels in the horizontal direction and 1080 lines in the vertical direction, or a format called a 480 i format composed of 720 pixels in the horizontal direction and 480 lines in the vertical direction, and the format can be changed at any time.

It is further noted that the above described coded data decoding portion is constituted by a single semiconductor device.

Next, the operation of the above-mentioned first embodiment is described below. The input coded data is temporarily stored in the external memory portion 12 as the decoded image data after being decoded. Then, the decoded data reading portion 2 reads the decoded data from the external memory portion 12 based on the sequence of the image output and outputs as the decoded data signals B1, when a decoded data request signal R1 is input from the first image format converting portion 3-1.

Subsequently, the first image format converting portion 3-1 converts the format of the decoded data signals B1 input from the decoded data reading portion 2 into, for example, the image prepared by the 1080 i format. The image after being subjected to the format conversion to the 1080 i format is output as the first image, which is synchronized with the first vertical image synchronizing signal A1, input from the image synchronizing signal generating portion 4, and the first horizontal image synchronizing signal. The first image format converting portion 3-1 generates and outputs the decoding data request signal R1 based on the first vertical image synchronizing signal A1 input from the image synchronizing signal generating portion.

On the other hand, the second image format converting portion 3-2 converts the input decoded data signal B1 into the image of, for example, a 480 i format image. This converted 480 i format image is output as the second image output, which is synchronized with the second vertical image synchronized signal A2, output from the image synchronizing signal generating and synchronization adjusting portion 5, and the second horizontal image synchronizing signals.

The image synchronizing signal generating portion 4 possesses a counter for the first vertical image synchronizing signal and a counter for the first horizontal image synchronizing signal, and both counters are operated by a standard clock (a dot clock) used for displaying an image of the image format converted by the first image format converting portion 3-1 and respective image synchronizing signals are generated by setting the count values of both counters to values corresponding to the image format of the first image output.

The image synchronizing signal generating and synchronization adjusting portion 5 possesses, similar to the image synchronizing signal generating portion 4, a counter for the second vertical image synchronizing signal and a counter for the second horizontal image synchronizing signal, and both counters are operated by a standard clock (a dot clock) used for displaying an image of the image format converted by the second image format converting portion 3-2 and respective image synchronizing signals are generated by setting the count values of both counters to values corresponding to the image format of the second image output. It is noted that the counter for the second vertical image synchronizing signals, which is possessed by the image synchronizing signal generating and synchronization adjusting portion 5 is adjusted and synchronized such that it generates the second vertical image synchronizing signal A2 at the same phase as the input first vertical image synchronizing signal A1.

It is noted that the first vertical image synchronizing signal A1 and the second vertical image synchronizing signal A2 are generated in the same cycles. For example, in the 1080 i format in the NTSC system and the 480 i format, the frequency of each vertical image synchronizing signal is 60 Hz.

It is also noted that the above-mentioned standard clock for the 1080 i format is (74.25÷1.001) MHz, and the standard clock for the 480 i format is 13.5 MHz.

Figure 2:
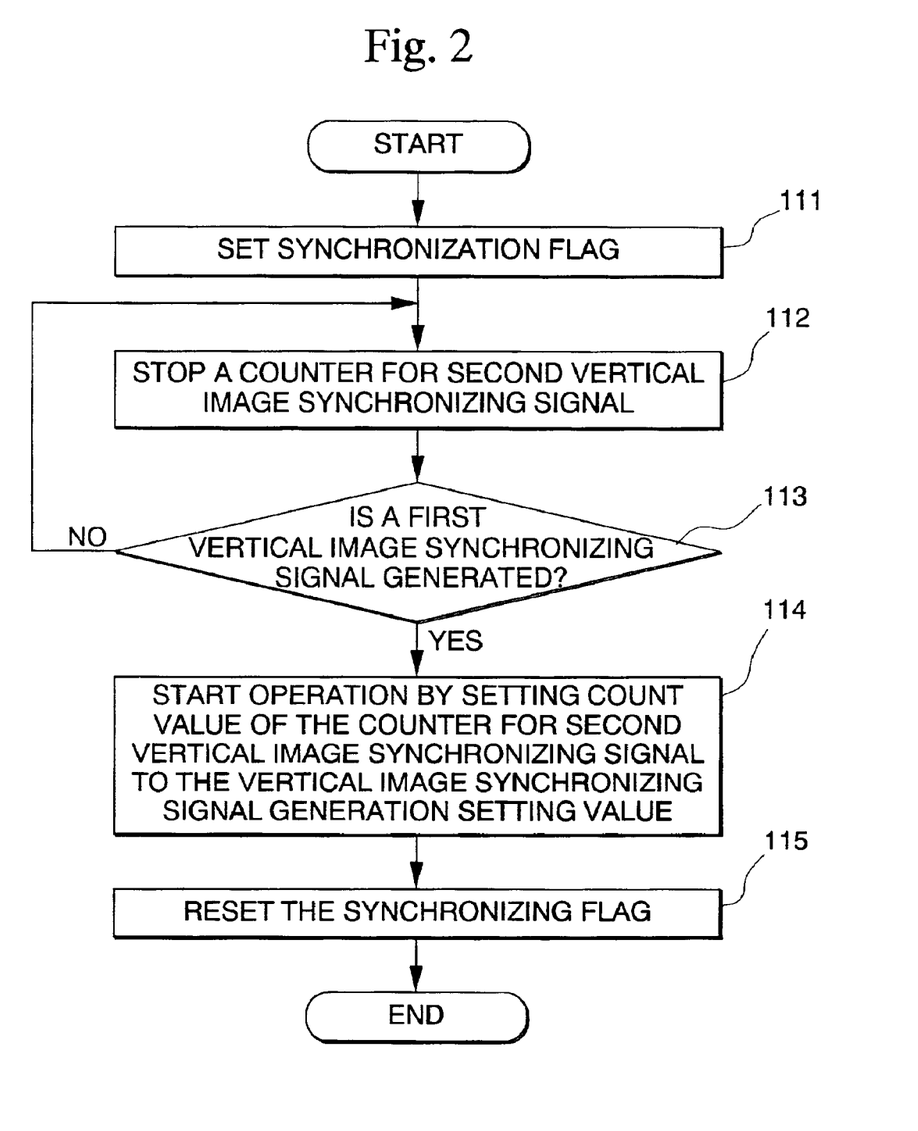
FIG. 2 is a flow chart for explaining an operation for generating the image synchronizing signal and the image synchronization adjustment portion 5 shown in FIG. 1.

FIG. 2 shows a flow-chart of an adjustment operation, carried out in the image synchronizing signal generating and synchronization adjusting portion 5, for synchronizing the counter for the second vertical image synchronizing signal with the first vertical image synchronizing signal A1. Referring now to FIG. 2, the operation for outputting the second vertical image synchronizing signal A2 synchronized with and at the same phase as that of the first vertical image synchronizing signal A1 is described.

First, when the image decoding apparatus is initialized, or when at least one of the image formats, being converted by the first image format converting portion 3-1 or the second image format converting portion 3-2, is converted, the CPU (Central Processing Unit) not shown in FIG. 1 sets the synchronizing flag, which is provided with the image synchronizing signal generation, synchronization adjustment portion 5 (step 111).

Subsequently, when the synchronizing flag is set by the CPU, the image synchronizing signal generating and synchronization adjusting portion 5 stops the counter for the second vertical image synchronizing signals (step 112).

Subsequently, the image synchronizing signal generating and synchronization adjusting portion 5 monitors whether or not the first vertical image synchronizing signal A1, which is input from the image synchronizing signal generating portion, is generated (step 113).

Subsequently, when the inputting first vertical image synchronizing signal A1 is generated (when the result of monitoring in step 113 is "YES"), the image synchronizing signal generating and synchronization adjusting portion 5 sets the count value of the counter for the second vertical image synchronizing signal to the vertical image synchronizing signal generation setting value corresponding to the image format of the second image output, and starts the counting operation of the counter for the second vertical image synchronizing signal (step 114).

Subsequently, the image synchronizing signal generating and synchronization adjusting portion 5 resets the synchronization flag (step 115).

It is noted that the above-mentioned vertical image synchronizing signal generation setting value means the value determined depending on the image format of the second image output such that the second vertical image synchronizing signal A2 is generated at the same phase as the first vertical image synchronizing signal A1.

As described above, the counter for the second vertical image synchronizing signal synchronized with the first vertical image synchronizing signal A1 generates the second vertical image synchronizing signal A2 adjusted at the same phase as the first vertical image synchronizing signal A1. Accordingly, the decoded data B1 output from the decoded data reading portion 2 is output after being read from the external memory portion in accordance with the decoded data request signal R1 generated based on the first vertical image synchronizing signal A1, and is also output synchronously with the second vertical image synchronizing signal A2. As a result, the second image format converting portion 3-2 outputs the image after being subjected to the image format conversion.

Figure 3:
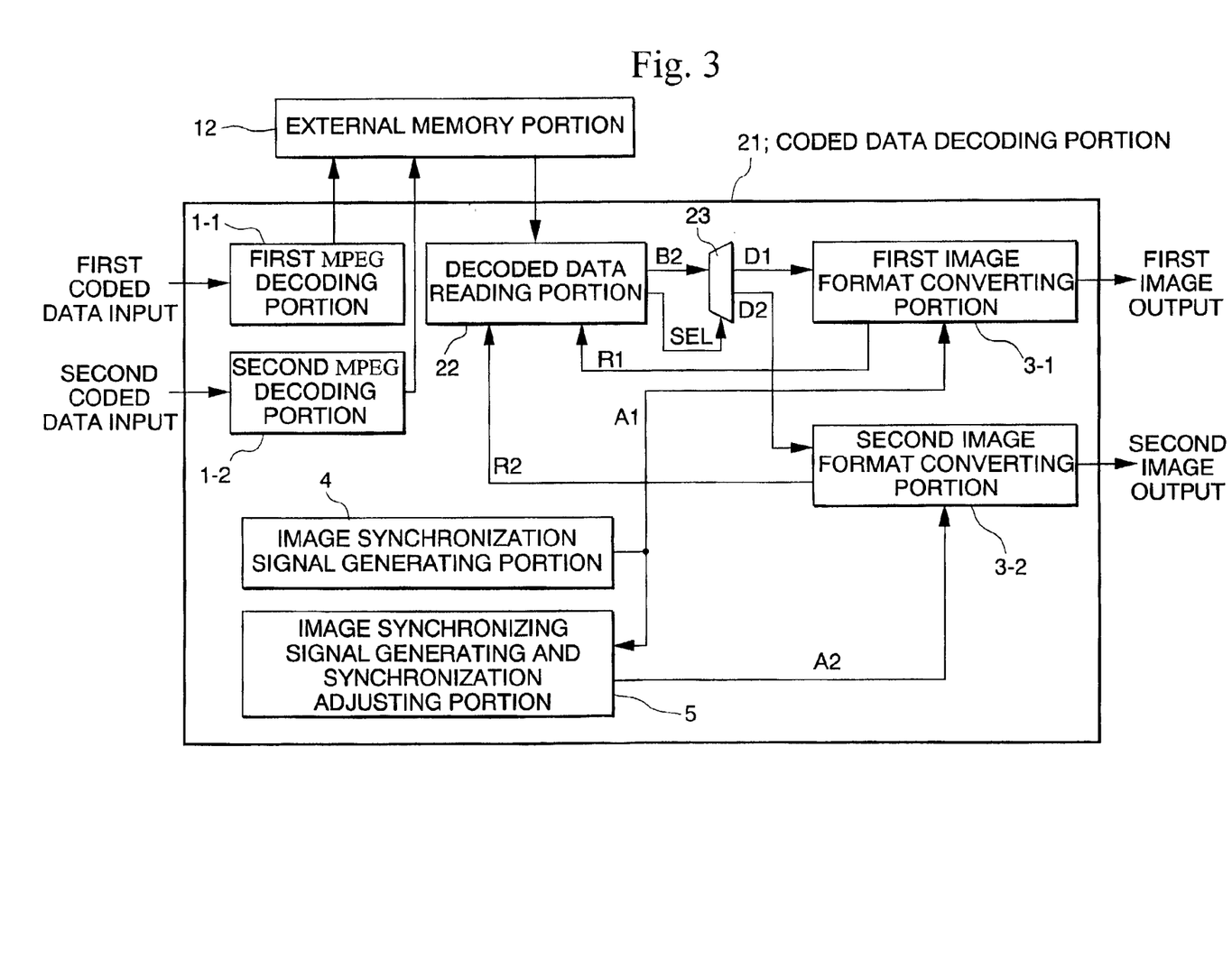
FIG. 3 is a block diagram showing the structure of the image decoding apparatus according to the second embodiment of the present invention.

Next, FIG. 3 is a block diagram showing the structure of the image decoding apparatus according to the second embodiment of the present invention. Below, the structure and operation of the second embodiment, which differs from the first embodiment, is described with reference to FIG. 3.

As shown in FIG. 3, the coded data decoding portion 21 comprises first and second MPEG decoding portions which decode inputting first and second coded data to first and second decoded data and store these data in the external memory portion, and a distribution portion 23 which distributes inputting multiplexing decoding data B2 in response to the distribution selection signal SEL input from the decoded data reading portion 22 into the first and second image format converting portions 3-1 and 3-2 as two decoded data D1 and D2.

Here, the second image format converting portion 3-2 generates and outputs the decoded data request signal R2 based on the second vertical image synchronizing signal A2, which is input from the image synchronizing signal generating and synchronization adjusting portion 5. Similar to the first embodiment, the first vertical image synchronizing signal A1 and the second vertical image synchronizing signal A2 are generated at the same phase synchronously with each other. Similarly, in response to the inputting decoded data request signal R2, the first and second decoding data, whose image formats are to be converted, are read from the external memory portion 12.

Subsequently, in response to the inputting decoded data request signal R1, the decoded data reading portion 22 reads the first or second decoded data, which are to be subjected to the format conversion by the first image format converting portion 3-1, from the external memory portion 12. Similarly, in response to the inputting decoded data request signal R2, the decoded data reading portion 22 reads the first or second decoded data, which are to be subjected to the format conversion by the second image format converting portion 3-2, from the external memory portion 12.

Subsequently, the decoded data reading portion 22 multiplexes the first and the second decoded data which have been requested by the first and the second image format converting portion 3-1 and 3-2 and outputs the multiplexed decoded data signal B2. The decoded data reading portion 22 also generates and outputs a distribution selection signal SEL, which instructs distributing addresses for distributing the first and second decoded data, multiplexed with the outputting multiplexed decoded data signal B2, based on the decoded data request signals R1 and R2.

Subsequently, based on the distribution selection signal SEL output from this decoded data reading portion 22, the distributing portion 23 distributes the first and second decoded data as the first and second data signals D1 and D2 to the first and second image format converting portions 3-1 and 3-2.

It is noted that the above described first coded data means coded bit stream image data in the MPEG format which is distributed by BS digital broadcasting and the like, and the second coded data means an image data coded bit stream image data in MPEG format which is read from a digital storage medium such as a DVD connected through a bus such as a PCI (Peripheral Component Interconnect).

Furthermore, the above-mentioned coded data decoding portion 21 is constituted as one single semiconductor device.

Figure 4:
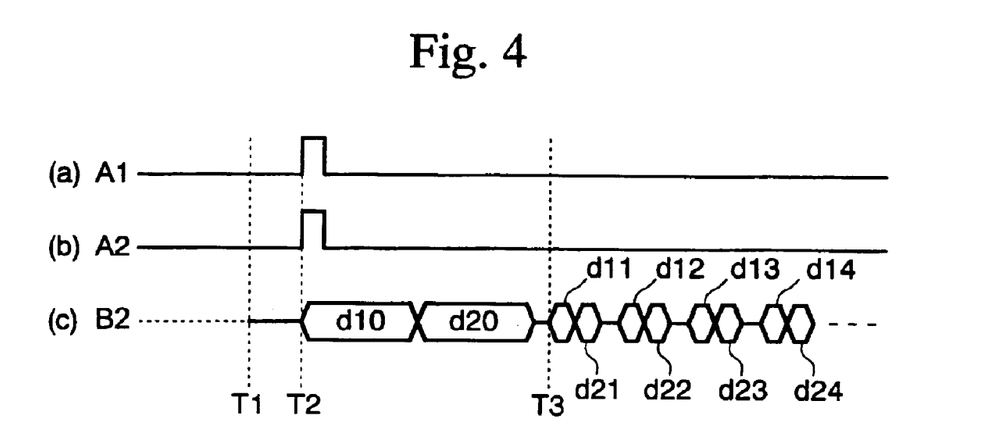
FIG. 4 is a first waveform diagram for explaining the operation the decoded data reading portion 22 shown in FIG. 3.

FIG. 4 is a diagram showing an example of the waveforms of the decoded data signal B2, with which the first or second decoded data to be distributed to the first or the second image format converting portions 3-1 and 3-2 by the above-described decoded data reading portion 22 is multiplexed.

The waveforms shown in FIGS. 4A and 4B show the first and second vertical image synchronizing signals A1 and A2 to be input into the first and second image format converting portions 3-1 and 3-2, and, similar to the first embodiment, these first and second vertical image synchronizing signals are generated in synchronization with each other and in phase with each other. FIG. 4C shows the multiplexed decoded data signal B2.

In the multiplexed decoded data signal B2, d10 and d20 are first and second filter parameters requested respectively by the first and second image format converting portions 3-1 and 3-2. These first and second filter parameters d10 and d20 are parameters used for converting the image into an image format stored previously in the external memory portion 12, and when the image decoding apparatus is initialized or in accordance with the modification of the image format executed by the first image format converting portion 3-1 or by the second image format converting portion 3-2, a request for reading the decoded data is requested by the first image format converting portion 3-1 or by the second image format converting portion 3-2. In response to this reading request, the decoded data reading portion 22 reads from the external memory portion 12 the first filter parameter d10 or the second filter parameter d20 and multiplexes these filter parameters to the multiplexed decoding data signal B2.

It is noted that, although the reading request of these first and second filter parameters d10 and d20 are conducted by using the decoded data request signal R1 and R2, similar to the first and second decoded data, the timings of generating request signals are preferably during the time of the non-display region in the vertical direction of the image display area, that is, during the time when it is not necessary to read the decoded data. In FIG. 4, the region between T1 and T3 is the non-display region in the image output of both first and second image format converting portions 3-1 and 3-2, since both the first vertical image synchronized signal A1 and the second vertical image synchronized signal A2 are generated at T2 in phase and synchronization with each other.

Here, d11, d12, d13, and d14 shown in FIG. 4C are the first or second decoded data requested to be read by the first image format converting portion 3-1, and d21, d22, d23, and d24 are the first or second decoded data requested by the second image format converting portion 3-2.

The above-described decoded data d11 to d14 and d21 to d24 are requested to read at a short interval by a small amount, for example, by each 16 dots. In addition, the period of time for reading the requested decoded data of d11 to d14 and d21 to d24 at each interval is shorter than the display time of these data, and, since the first and second image format converting portions 3-1 and 3-2 are provided with buffers for temporarily storing the inputting decoded data, these decoded data can be multiplexed on the multiplexing decoded data signal B2.

Here, as shown in FIG. 4, both the first and second vertical image synchronizing signals A1 and A2 are generated at the time T2, and the decoded data request signals R1 and R2 are output based on the respective vertical image synchronizing signals A1 and A2 from the respective image format converting portions 3-1 and 3-2. Subsequently, the decoded data reading portion 22 reads the first filter parameter d10 and the second filter parameter d20 from the external memory portion 12 and outputs the signal after multiplexing on the multiplex decoded data signal B2. However, if the first vertical image synchronizing signal A1 and the second vertical image synchronizing signal A2 are not generated in phase synchronously with each other, it is not possible to multiplex within the time region from T1 to T3 as shown in FIG. 4.

Figure 5:
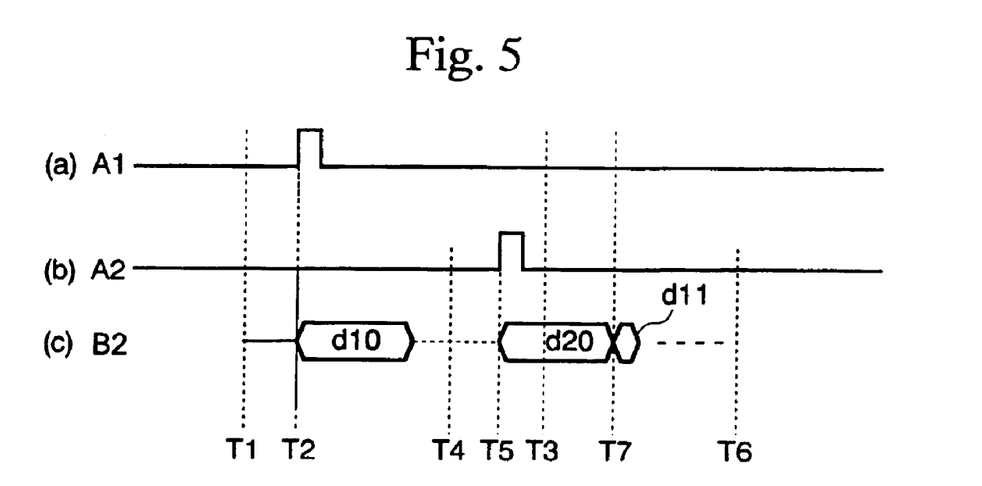
FIG. 5 is a second waveform diagram for explaining the operation of the decoded data reading portion shown in FIG. 3.

FIG. 5 is a waveform showing an example of a case in which respective filter parameters d10 and d20 cannot be multiplexed in the non-displaying region, because the first vertical image synchronizing signal A1 and the second vertical image synchronizing signal A2 are not generated in phase synchronously with each other. As shown in FIG. 5, the first vertical image synchronizing signal A1 is generated at T2, similar to the timing shown in FIG. 4, and the second vertical image synchronizing signal A2 is generated at the time T5, which differs from the time shown in FIG. 4, and the phase is also different. The non-displaying region of the image output of the first image format conversion signal A1 is in the same region of T1 to T3 as that shown in FIG. 4, and the second image format conversion signal A2 is generated at the time T5, which differs from that shown in FIG. 4. The non-displaying region of the image output of the first image format conversion signal A1 is in the same region of T1 to T3 as that shown in FIG. 4, and the non-displaying region of the image output of the second image format conversion signal A2 is in the region of T4 to T6, which differs from the timing shown in FIG. 4.

As shown in FIG. 5, since the non displaying regions for the first and second image format converting portions 3-1 and 3-2 are different, the timing to read the second filter parameter becomes T5, which differs from that shown in FIG. 4. Accordingly, the timing to read the decoded data d11 requested by the first image format converting portion 3-1 becomes the time T7 after completion of reading the second filter parameter d20, so that it is not possible to read at the time T3, which is a reading time earlier than the time T7. As a result, the image to be output by the first image format converting portion 3-1 is not prepared in time, and the first image output fails.

However, as shown in the second embodiment, if the first vertical image synchronizing signal A1 and the second vertical image synchronizing signal A2 can be generated in phase synchronous with each other, it becomes possible to multiplex the respective filter parameters d10 and d20 with the multiplex decoded data signal B2 within the non displaying periods between T1 and T3, and it is possible to prevent failure of the first image output because the decoded data d11 can be read at the time T3 which is the predetermined time to read.

In the above first and second embodiments, the apparatus is provided with two image format conversion regions comprising the first image format converting portion 3-1 and the second image format converting portion 3-2, and the apparatus may be provided with three or more than three image format converting portions. However, when the apparatus is provided with three or more than three image format converting portions, it is necessary to provide a combination of the image format converting portion and the vertical image synchronizing signal generating and synchronization adjusting portion such that the vertical image synchronizing signal produced by the vertical image synchronizing signal generating and synchronization adjusting portion is generated at the same phase synchronously with the vertical image synchronizing signal A1.

It is noted in the first and second embodiments that it is preferable for all or a part of the coded data decoding portion to be formed on the same semiconductor integrated circuit substrate.

As described above, the image decoding apparatus of the present invention is capable of outputting images simultaneously in different formats without failure, by providing a first image format conversion device and a second image format conversion device such that the second vertical image synchronizing signal used for the image output by the second image format conversion device is synchronized with the first image synchronous signal used for the image output by the first image format conversion device.

Furthermore, since the second vertical image synchronizing signal used for the image output by the second image format conversion device is synchronized with the first vertical image synchronizing signal used for the image output by the first image format conversion device, the first and second image format conversion device can be commonly used as the decoded data reading device for reading the image data from an external memory device and outputting the image data as the decoded data, which results in preventing an increase of the size of the apparatus.

What is claimed is:

1. An image decoding apparatus comprising:
   a decoding device for converting input image coded data for generating and outputting image data by decoding said image coded data;
   a memory device for storing decoded image data generated by said decoding device;
   first to N-th, N being an integer 2 or more, image format conversion devices for generating first to N-th images by converting said decoded image data read from the memory device into respective predetermined image formats determined by input filter parameters, and outputting said first to N-th images in synchrony with input first to N-th vertical image synchronizing signals which are synchronized with each other; and
   wherein a non-display period is provided between a common timing of each of said vertical image synchronizing signals and a timing of said image data; and
   wherein said filter parameters are multiplexed with the decoded image data in said non-display period.

2. An image decoding apparatus according to claim 1, wherein the image decoding apparatus further comprises:
   an image synchronizing signal generation device for generating and outputting the first vertical image synchronizing signal used for outputting said image by any one of the image format conversion device among said first to N-th image format conversion devices; and
   first to M-th, M being an integer equal to N−1, image synchronizing signal generating and synchronization adjusting devices for generating and outputting the second to the N-th vertical image synchronizing signals respectively in synchronization with said first vertical image synchronizing signal used for outputting said images by said image format conversion devices other than said one of the image format conversion device.

3. An image decoding apparatus according to claim 2, wherein said first to M-th image synchronizing signal generating and synchronization adjusting devices comprise:
   a counter for generating any one of said second to N-th vertical image synchronizing signals generated and output respectively by said first to M-th image synchronizing signal generating and synchronization adjusting devices; and
   a counter control device for controlling the operation of said counter based on said first vertical image synchronizing signal.

4. An image decoding apparatus according to claim 1, wherein said filter parameters are input to said first to N-th image format conversion devices in a predetermined period during which no decoded image data are input to said first to N-th image format conversion devices.

5. An image decoding apparatus according to claim 4, wherein said filter parameters are multiplexed with said decoded image data, and the multiplexed data are input to said first to N-th image format conversion devices.

6. An image decoding apparatus according to claim 5, wherein the non-display period includes a period between the time said vertical image synchronizing signals are input to said first to N-th image format conversion devices and the time said decoded image data are input to said first to N-th image format conversion devices.

7. An image decoding apparatus according to claim 4, wherein said vertical image synchronizing signals are input to said first to N-th image format conversion devices at the same phase.

8. An image decoding apparatus according to claim 4 wherein said respective filter parameters are input to said first to N-th image format conversion devices in synchrony with said vertical image synchronizing signals corresponding thereto.

9. An image decoding apparatus according to claim 1, wherein said input image coded data is coded bit stream in MPEG form.

10. An image decoding apparatus according to claim 1, wherein the non-display period includes a period between the time said vertical image synchronizing signals are input to said first to N-th image format conversion devices and the time said decoded image data are input to said first to N-th image format conversion devices.

11. An image decoding apparatus comprising:
    first to N-th decoding devices which convert input first to N-th image coded data for generating and outputting first to N-th image data by decoding said first to N-th image coded data;
    a memory device for storing said first to N-th image data generated by respective decoding devices;
    first to N-th image format conversion devices for generating first to N-th images by converting any of image data from among said first to N-th image data read from the memory device into respective predetermined image formats determined by input filter parameters, and outputting said first to N-th images in synchrony with input first to N-th vertical image synchronizing signals which are synchronized with each other; and
    wherein a non-display period is provided between a common timing of each of said vertical image synchronizing signals and a timing of said image data; and
    wherein said filter parameters are multiplexed with the image data in said non-display period.

12. An image decoding apparatus according to claim 11, wherein the image decoding apparatus comprises a distribution control apparatus for distributing any of the image data among said first to N-th image data respectively to first to N-th image format conversion devices, in response to a request of said first to N-th image format conversion devices.

13. An image decoding apparatus according to claim 11, wherein said filter parameters are input to said first to N-th image format conversion devices in a predetermined period during which no image data are input to said first to N-th image format conversion devices.

14. An image decoding apparatus according to claim 13, wherein said filter parameters are multiplexed with said image data, and the multiplexed data are input to respective first to N-th image format conversion devices.

15. An image decoding apparatus according to claim 14 wherein the non-display period includes a period between the time said vertical image synchronizing signals are input to said first to N-th image format conversion devices and the time said image data are input to said first to N-th image format conversion devices.

16. An image decoding apparatus according to claim 13, wherein said vertical image synchronizing signals are input to said first to N-th image format conversion devices at the same phase.

17. An image decoding apparatus according to claim 13, wherein said respective filter parameters are input to said first to N-th image format conversion devices in synchrony with said vertical image synchronizing signals corresponding thereto.

18. An image decoding apparatus according to claim 11, wherein said input first to N-th image coded data are coded bit stream in MPEG form.

19. An image decoding apparatus according to claim 11, wherein the non-display period includes a period between the time said vertical image synchronizing signals are input to said first to N-th image format conversion devices and the time said decoded image data are input to said first to N-th image format conversion devices.

20. A semiconductor device comprising:
a decoding device for generating image data by decoding input image coded data, and for storing the thus generated image data in a memory device;
a decoded data reading device for reading said image data stored in said memory device in response to an inputting decoded data request signal and for outputting said image data as decoded data signal;
a first image format conversion device for generating a first image by converting said decoded data signal into a predetermined image format determined by an input first filter parameter, and for outputting said first image in synchrony with an input first vertical image synchronizing signal; and
a second image format conversion device for generating a second image by converting said decoded data signal into a predetermined image format determined by an input second filter parameter, and for outputting said second image in synchrony with an input second vertical image synchronizing signal which is synchronized with said first vertical image synchronizing signal; and
wherein a non-display period is provided between a common timing of each of said first and second vertical image synchronizing signals and a timing of said image data; and
wherein said first and second filter parameters are multiplexed with said decoded data signal in said non-display period.

21. An image decoding apparatus according to claim 20, wherein the non-display period includes a period between the time said vertical image synchronizing signals are input to said first and second image format conversion devices and the time said decoded data signal are input to said first and second image format conversion devices.

22. A semiconductor device comprising:
a first decoding device for generating first image data by decoding input first image coded data and for storing the generated first image data in a memory device;
a second decoding device for generating second image data by decoding input second image coded data, and for storing the generated second image data in the memory device;
a decoded data reading device for reading said first or second image data stored in said memory device in response to an inputting first decoded data request signal and for reading said first or second image data stored in said memory device in response to an inputting second decoded data request signal and for outputting said first and second image data;
a distribution control device for distributing said first and second image data as a first decoded data signal corresponding to said first decoded data request signal and a second decoded data signal corresponding to said second decoded data request signal;
a first image format conversion device, which outputs the first decoded data request signal for generating a first image by converting said first decoded data signal into a first predetermined image format determined by an input first filter parameter and for outputting said first image in synchrony with an input first vertical image synchronizing signal; and
a second image format conversion device which outputs the second decoded data request signal for generating a second image by converting said second decoded data signal into a second predetermined image format determined by an input second parameter, and for outputting said second image in synchrony with an input second vertical image synchronizing signal which is synchronized with said first vertical image synchronizing signal; and
wherein a non-display period is provided between a common timing of each of said first and second vertical image synchronizing signals and a timing of said image data; and
wherein said first and second filter parameters are multiplexed with said image data in said non-display period.

23. An image decoding apparatus according to claim 22, wherein the non-display period includes a period between the time said vertical image synchronizing signals are input to said first and second image format conversion devices and the time said image data are input to said first to and second image format conversion devices.

24. An image decoding method for decoding an inputting image coded data and for generating an image data comprising the steps of:
generating a first image by converting said image data into a predetermined image format determined by an input first filter parameter and outputting the generated first image in synchrony with an input first vertical image synchronizing signal; and
generating a second image by converting said image data into a predetermined image format determined by an input second filter parameter and outputting the generated second image in synchrony with an input second vertical image synchronizing signal which is synchronized with said first vertical image synchronizing signal; and
wherein a non-display period is provided between a common timing of each of said first and second vertical image synchronizing signals and a timing of said image data; and
wherein said first and second filter parameters are multiplexed with said image data in said non-display period.

25. An image decoding method according to claim 24, wherein the non-display period includes a period between the time said vertical image synchronizing signals are input and the time said image data are input.

26. An image decoding method comprising:
generating a first image data by decoding an inputting first image coded data;

generating a second image data by decoding an inputting second image coded data;

controlling the distribution of said first and second image data to their request sources;

generating a first image from said requested first image data by converting into a predetermined image format determined by an input first filter parameter and outputting said first image in synchrony with an input first vertical image synchronizing signal; and generating a second image from said requested second image data by converting into a predetermined image format determined by an input second filter parameter and outputting said second image in synchrony with an input second vertical image synchronizing signal which is synchronized with said first vertical image synchronizing signal; and wherein a non-display period is provided between a common timing of each of said first and second vertical image synchronizing signals and a timing of said image data; and wherein said first and second filter parameters are multiplexed with said image data in said non-display period.

27. An image decoding method according to claim 26, wherein the non-display period includes a period between the time said vertical image synchronizing signals are input and the time said image data are input.

* * * * *